United States Patent [19]

Morita

[11] Patent Number: 4,890,805
[45] Date of Patent: Jan. 2, 1990

[54] ELECTRICAL CORD CLAMP

[75] Inventor: Katsuyuki Morita, Kasugai, Japan

[73] Assignee: Kitagawa Industries Co., Ltd., Japan

[21] Appl. No.: 219,303

[22] Filed: Jul. 15, 1988

[30] Foreign Application Priority Data

Jul. 29, 1987 [JP] Japan ................... 62-116439

[51] Int. Cl.$^4$ .............................................. F16L 3/08
[52] U.S. Cl. ...................................... 248/74.2; 248/71; 24/453
[58] Field of Search ................ 248/74.2, 74.3, 74.4, 248/74.1, 51, 52, 71; 24/453

[56] References Cited

U.S. PATENT DOCUMENTS 2,488,255  11/1949  Allen ........................................ 248/51
4,566,660  1/1986  Anscher et al. ...................... 248/74.2
4,688,829  8/1987  Shioda et al. ........................ 248/74.2

FOREIGN PATENT DOCUMENTS 2819923  11/1978  Fed. Rep. of Germany ....... 24/74.2
2734753  2/1979  Fed. Rep. of Germany ..... 248/74.3
55-62092  4/1980  Japan .
5750748  11/1980  Japan .

Primary Examiner—Alvin C. Chin-Shue
Attorney, Agent, or Firm—Oliff & Berridge

[57] ABSTRACT

A cord clamp comprises an arm, a cord support member, an arm support member, a hinge portion between the arm and the arm support member, a fixing member to fasten the cord clamp on a base plate, and first and second hooks provided on the arm support member to position the arm. The arm can swing on the hinge portion so as to be secured selectively at a first position by means of the first hook and at a second position by means of the second hook, wherein the first position is perpendicular to the second position. The cord support member is provided with a recess to secure a cord therein, and beneath the recess is a slit where the cord can move in its axial direction.

15 Claims, 11 Drawing Sheets

ELECTRICAL CORD CLAMP

BACKGROUND OF THE INVENTION

The present invention relates to an electrical cord clamp, and more particularly to a cord clamp used on the inner surface of the base plate of a television cabinet, the engine area of an automobile, etc., which contain any electrical apparatus therein.

Some color television receivers are provided with a demagnetization coil which is not covered by a demagnetization case and is directly attached to the cathode-ray tube. If a cord clamp is attached to the base plate of the cabinet of this kind of television receiver in order to attach a high tension lead wire for directly feeding high tension to an anode of the cathode-ray tube, the cord clamp will become an obstacle in the case of attaching the cathode-ray tube to the cabinet, thus deteriorating working efficiency.

To solve this problem, there have been proposed Japan published unexamined utility model application 55-62092 and Japan published examined utility model application 57-50748. According to the former utility model numbered 55-62092, a cord clamp comprises a body portion and a support member both being shiftable on a hinge, and this cord clamp is attached inside the cabinet in advance with its body portion and support member locked together. According to the latter utility model numbered 57-50748, a cord clamp attached to the demagnetization coil is fixed to the cathode ray tube prior to the installation of the cathode ray tube in the cabinet. These cord clamps still have some problems, specifically: the cord clamp disclosed in 57-50748 projects from the cathode-ray tube even though it does not project from the cabinet; also, it is apt to move with the demagnetization coil. Thus, it is likely to catch the clothes of a worker who is attaching the cathode-ray tube in the cabinet, and probably become disturbing to the worker. As to the cord clamp disclosed in 55-62092, on the other hand, it is fixed in the cabinet in advance and therefore does not disturb the attachment of the cathode-ray tube in the cabinet. However, after the attachment of the cathode-ray tube, it is not easy for the worker, who is wearing gloves, to pull up the cord clamp which adheres close to the attached area like a plate. Another problem of this clamp is that it is only used perpendicularly to the fixing surface. Thus, this clamp is not available unless the surface is perpendicular to the cord clamp.

SUMMARY OF THE INVENTION

It is accordingly an object of the present invention to provide a cord clamp which can selectively be used at a first-determined position as well as at a second-determined position.

It is a further object to provide a cord clamp of which arm can be easily engaged with an arm support member at one of the determined positions and also can easily be changed from one position to another, so that the cord clamp attached on the base plate of an apparatus does not disturb the subsequent working processes.

It is still a further object to provide a cord clamp which comprises an elastic portion on the arm support member at a predetermined distance from the base plate in order to maintain a determined distance between the attached surface of the base plate and the arm, thus facilitating the change of the arm's position from one to the other.

It is still a further object to provide a cord clamp which can be used even if no surface perpendicular to the cord clamp exists and which does not disturb the subsequent working processes.

These objects are attained by a cord clamp comprising; an arm; a cord support member connected to one end of the arm for holding a cord; an arm support member connected to the other end of the arm so as to swing said arm from a first position to a second position and vice versa; a hinge which joins the arm to the arm support member; a first hook and a second hook provided on the arm support member for releasably locking an engaging tooth of the arm at said first position and said second position respectively; and a fixing member extending from the arm support member to fasten the cord clamp on a base plate.

BRIEF DESCRIPTION OF THE DRAWINGS

The present invention is described in more detail with examples and reference to the accompanying drawings, in which.

DETAILED DESCRIPTION OF THE PREFERRED EMBODIMENT

Hereinafter, a cord clamp of the present invention will be described in detail with reference to the drawings.

Figure 1:
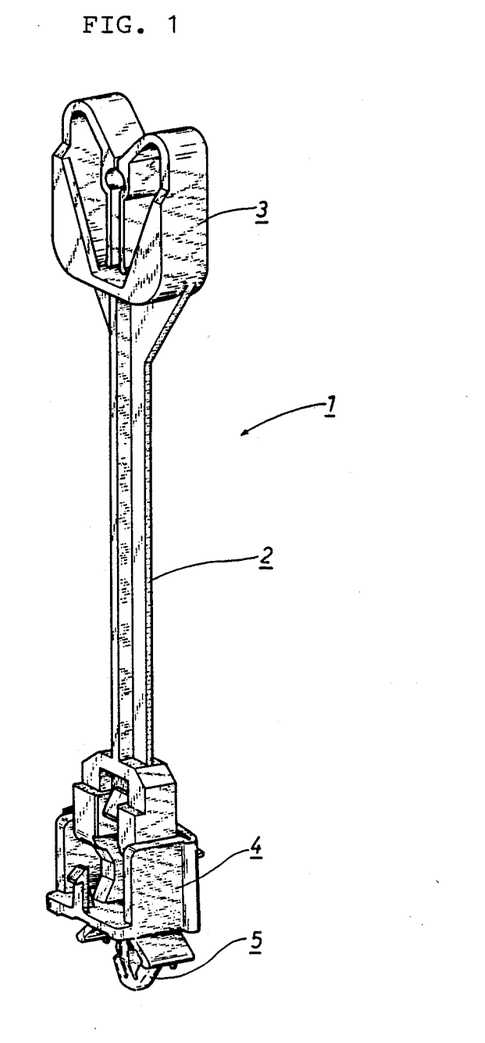
FIG. 1 is a perspective view of a cord clamp embodying the present invention.

FIG. 1 shows a cord clamp 1 wherein an arm 2 is engaged with an arm support member 4 at a second predetermined position, which will be explained later. The cord clamp 1 comprises: a cord support member 3 at an upper end of the bar-shaped arm 2; and the arm support member 4 at an lower end thereof. The cord clamp 1 further comprises a fixing member 5 on the lower surface of the arm support member 4, so that the arm support member 4 is located between the arm 2 and the fixing member 5.

Figure 2A:
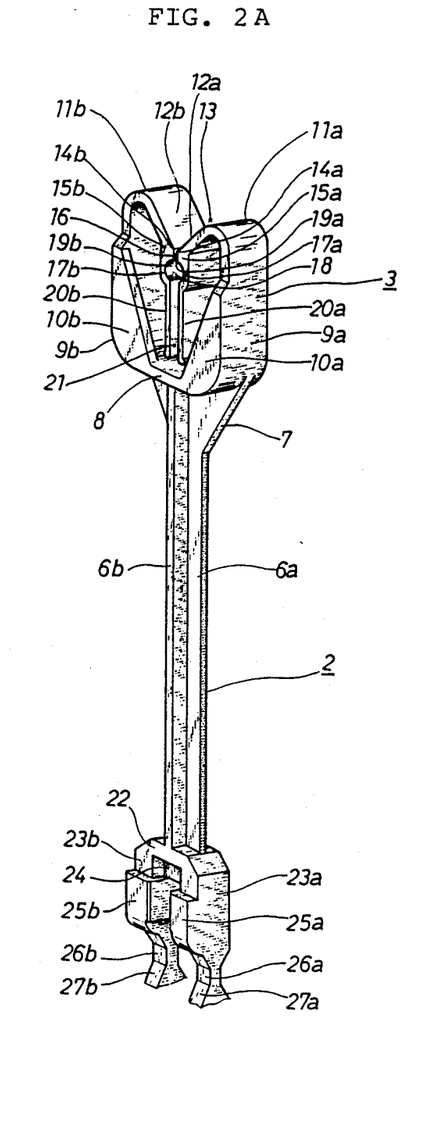
FIGS. 2A, 2B, 2C and 2D are partial perspective views showing the cord clamp of FIG. 1 from different angles while omitting some portions thereof.
Figure 2B:
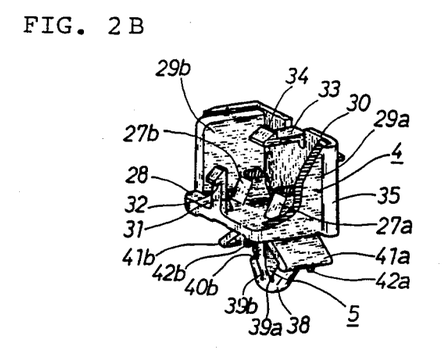
Figure 2C:
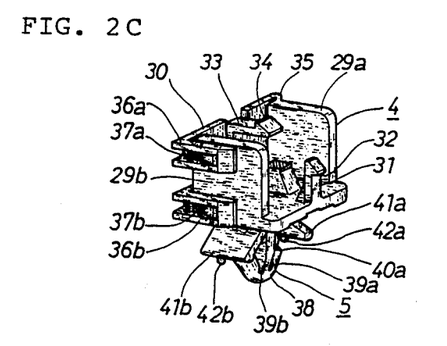
Figure 2D:
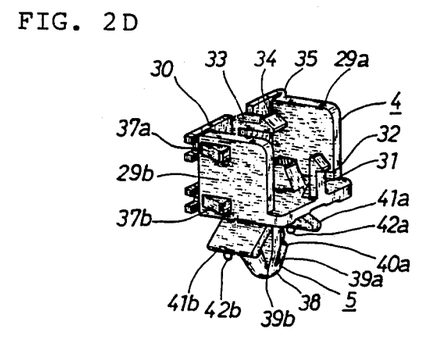

FIG. 2A is a perspective view of the cord clamp 1, i which the arm support member 4 and the fixing member 5 shown in FIG. 1 are omitted. FIG. 2B is a perspective view thereof in which the arm 2 and the cord support member 3 are omitted and the arm support member 4 is partially cut away from FIG. 1. FIG. 2C is a perspective view of the arm support member 4 and the fixing member 5 viewed from the left and upper direction of FIG. 2B. FIG. 2D is another perspective view in which part of the arm support member 4 is cut away from FIG. 2C. FIGS. 3A, 3B, 3C and 3D are a front view, a left side view, a right side view, and a bottom view, respectively, of the cord clamp 1 immediately after the injection molding. FIGS. 4A and 4B are a front view and a right side view, respectively, in which the arm support member 4 and the fixing member 5 are omitted from FIGS. 3A and 3C.

Figure 4A:
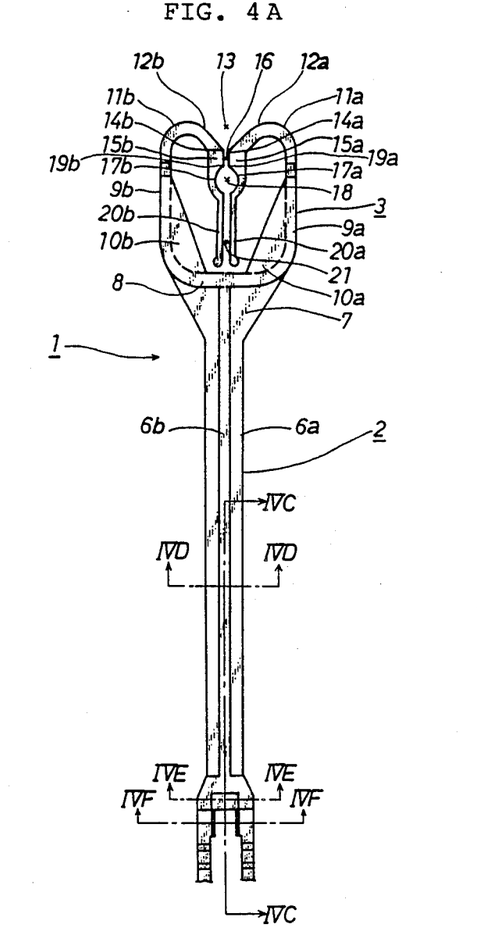
FIG. 4A is a partially omitted illustration of the front view in FIG. 3A.
Figure 4B:
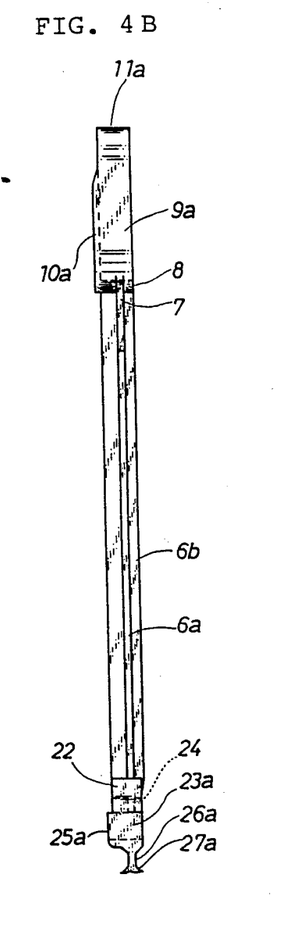
FIG. 4B is a right side view of FIG. 4A.
Figure 4C:
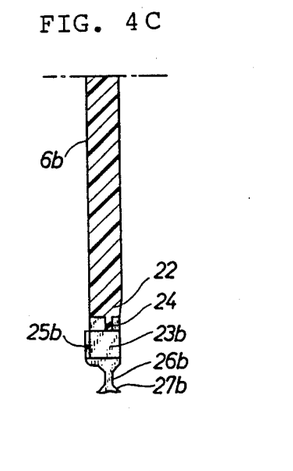
FIGS. 4C, 4D, 4E and 4F are sectional views of an arm of the cord clamp, each being taken along a section line IVC—IVC, IVD—IVD, IVE—IVE and IVF—IVF, respectively.
Figure 4D:
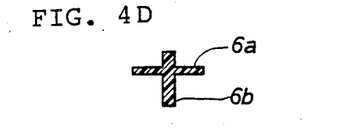
Figure 4E:
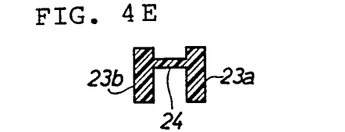
Figure 4F:
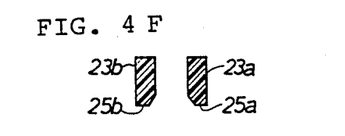

First, the structure of the arm 2 and the cord support member 3 will now be described with reference to FIG. 2A. A bar portion of the arm 2 consists of a pair of band stems 6a and 6b which are perpendicular to each other, thus forming a cruciform section shown in FIG. 4D. Each of the band stems 6a and 6b prevents the other from bending, resulting in the increase in the second moment of area of the arm 2. An upper end of band stem 6a spreads out to the right and left to form a brace 7. A cord support base 8 is provided at the lower portion of the cord support member 3, and firmly supported by the band stem 6b and the brace 7 in the plane perpendicular to the arm 2. The cord support base 8 which extends along the brace 7 curves upward at both ends of the brace 7, thereby forming cord support side walls 9a and 9b in right and left upper portion of the cord support base 8. The cord support base 8 and the cord support side walls 9a and 9b constitute a U-shaped frame where the cord support base 8 exists as a bottom. A pair of braces 10a and 10b are provided inside the U-shaped frame and on a front face thereof so as to support the cord support side walls 9a and 9b. The cord support side walls 9a and 9b curve at upper curved portions 11a and 11b, and then constitute insert guides 12a and 12b which extend obliquely downward toward the center of the U-shaped frame. Between the insert guides 12a and 12b is established a V-shaped insert groove 13. The insert guides 12a and 12b comprise corners 14a and 14b at the bottom of the V-shaped insert groove 13, and further comprise cord fastening portions 15a and 15b extending downward from the corners 14a and 14b. Between the cord fastening portions 15a and 15b is established an insert gap 16 continuing from the lower part of the insert groove 13. The cord fastening portions 15a and 15b are provided with semi-circular recesses 17a and 17b which are opposite to each other, thereby forming a cord insert hole 18. At the upper corners of the recesses 17a and 17b are located cord stoppers 19a and 19b. The cord fastening portions 15a and 15b extend downward further from the recesses 17a and 17b so as to form strips 20a and 20b. More particularly, the strips 20a and 20b made of a thin plate extend from the cord fastening portions 15a and 15b toward the cord support base 8, and a slit 21 is established between the strips 20a and 20b.

Next, an explanation will be presented for the construction of the connecting portion of the arm 2 and the arm support member 4. The lower ends of the band stems 6a and 6b are made integrally with a joint top 22. The joint top 22 extends to the left and the right in the plane perpendicular to both the band stems 6a and 6b, and the right and left sides of the joint top 22 are provided with joint side portions 23a and 23b extending downward therefrom. The joint top 22 and the joint side portions 23a and 23b constitute a reverse U-shaped frame opening downward. The lower surface of the joint top 22 is provided with an engaging tooth 24 which projects downward between the joint side portions 23a and 23b. Spacers 25a and 25b are provided on the lower half of the front face of the joint side portions 23a and 23b. At the lower ends of the joint side portions 23a and 23b are provided hinges 26a and 26b which connect with the arm support member 4 by means of leg portions 27a and 27b (explained later).

Referring to FIGS. 2B, 2C and 2D, the structure of the arm support member 4 and the fixing member 5 will be described hereinafter. The leg portions 27a and 27b are located on the upper surface of an arm support base 28. Two arm support side walls 29a and 29b stand upright at the right and left edges of the upper surface of the arm support base 28. An arm support back wall 30 also stands on the upper surface of the arm support base 28 perpendicularly to the arm support base 28 and to the arm support side walls 29a and 29b, so as to cover the rear side of the arm support member 4. Thus, the arm support base 28, the arm support side walls 29a and 29b, and the arm support back wall 30 constitute a box-like frame whose upper and front sides are open. A first hook 31 projects upright from the front central portion of the arm support base 28. The upper end of the first hook 31 slants forward, thereby forming a step portion 32 which is to be engaged with the back face of the engaging tooth 24 provided on the lower end of the arm 2. Consequently, the arm 2 is located at a first predetermined position relative to the arm support member 4.

At the center of the upper edge of the arm support back wall 30 is provided a second hook 33 projecting into the above-mentioned box-like frame and vertically to the arm support back wall 30. A free end of the second hook 33 slants upward to form a step portion 34 which engages with the front face of the engaging tooth 24 provided at the lower end of the arm 2. Consequently, the arm 2 is located at a second predetermined position relative to the arm support member 4. The arm support back wall 30 is joined to the arm support side wall 29a by a hinge 35. As shown in FIG. 2C, the arm support back wall 30 is provided with upper and lower lock members 36a and 36b at its side opposite to the hinge 35. The lock members 36a and 36b, each having a square opening at the center thereof, project in the same direction to the second hook 33. As shown in FIG. 2D, the arm support side wall 29b is provided with upper and lower protrusions 37a and 37b at the rear portion thereof. The protrusions 37a and 37b are engaged in the central openings of the lock members 36a and 36b, respectively, as shown in FIG. 2C. As a result, the arm support back wall 30 is engaged with the arm support side wall 29b. A fastening member 38 projects at the center of the lower surface of the arm support base 28. The fastening member 38 is provided with: apertures 39a and 39b opening from the front to the rear; and step portions 40a and 40b which are fit to a fixing hole 48 on a base plate (see FIG. 7). When the fastening member 38 is plugged in the hole 48, the step portions 40a and 40b are pressed inward. After insertion, they return to the original shape to engage with the hole 48. From the root of the fastening member 38, plate-like resilient wings 41a and 41b extend to the right and the left downward, respectively. At the center of the lower edge of the resilient wings 41a and 41b are located protrusions 42a and 42b for preventing the rotation of the fixing member 5.

As shown in FIGS. 3A, 3B, 3C and 3D, the cord support member 3 of the cord clamp 1 is molded together with the upper end of the arm 2 to be located on the same line. The arm support member 4 is molded together with the lower end of the arm 2 via the hinges 26a and 26b. The fixing member 5 is molded together directly with the lower face of the arm support member 4. Furthermore, the arm support side wall 29a and the arm support back wall 30 of the arm support member 4 are molded integrally via the hinge 35.

Figure 3A:
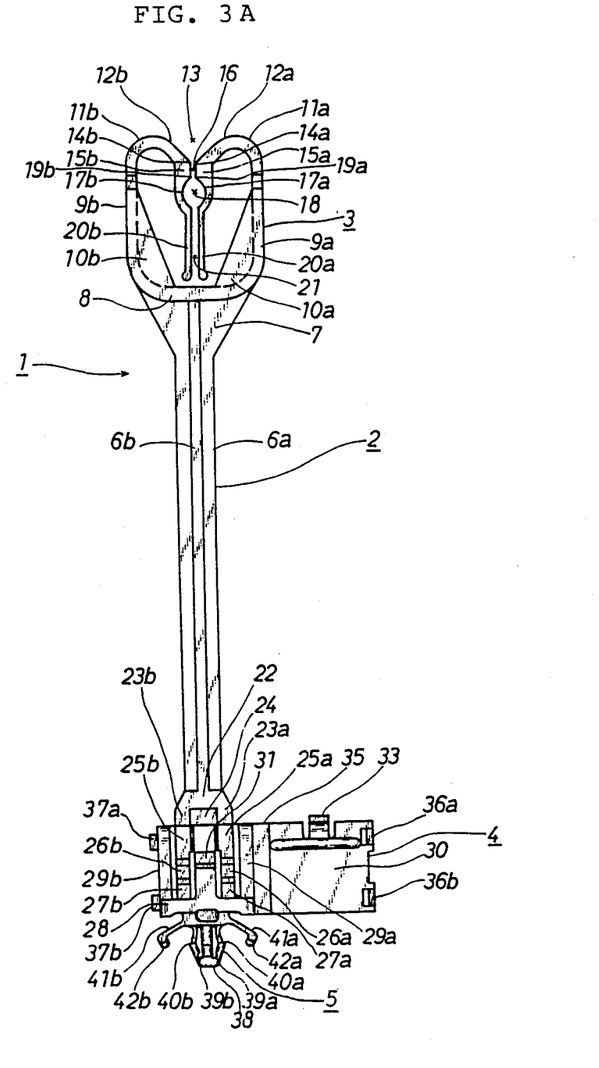
FIG. 3A is a front view of the cord clamp immediately after molding.
Figure 3B:
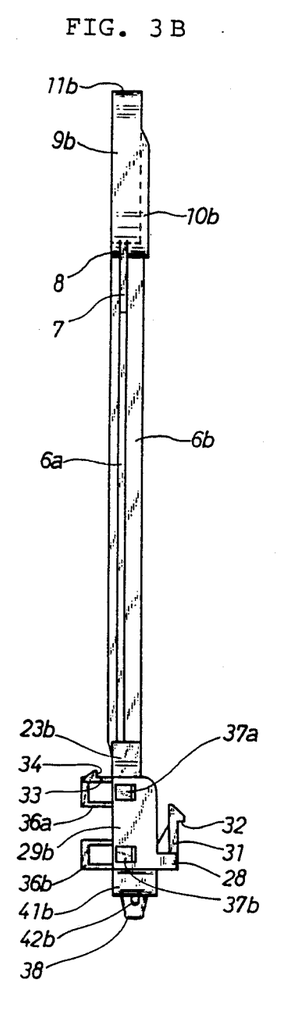
FIGS. 3B and 3C are left and right side views thereof.
Figure 3C:
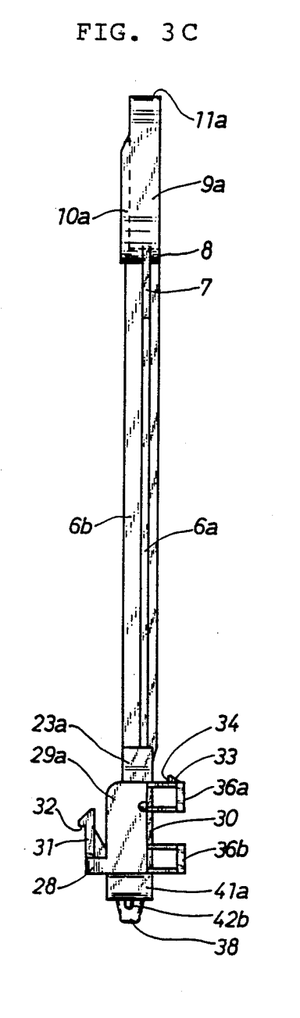
Figure 3D:
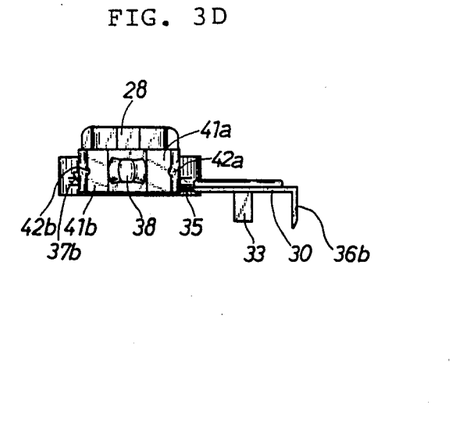
FIG. 3D is a bottom plan view thereof.
Figure 5A:
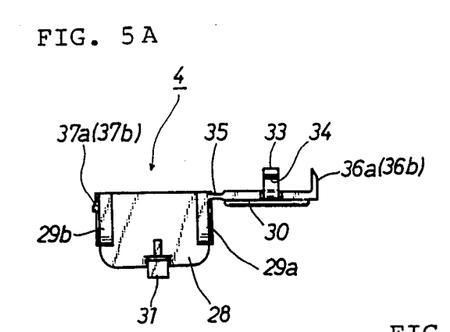
FIG. 5A is a plan view of the main portion of an arm support member immediately after molding.
Figure 5B:
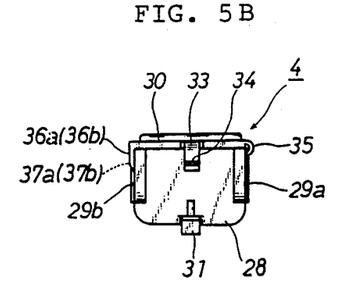
FIG. 5B is a plan view of the main portion of the arm support member in its working state.

FIG. 5A is a plan view showing the main portion of the arm support member 4 of the cord clamp 1—shown in FIGS. 3A, 3B and 3C—after molding. On the other hand, FIG. 5B is a plan view showing the main portion of the arm support member 4 in its working state. Referring to FIGS. 5A and 5B, when the cord clamp 1 is to be used, the arm support back wall 30 is swung at the hinge 35 with a result that the lock members 36a and 36b are engaged with the protrusions 37a and 37b to complete the arm support member 4. Thus, the arm 2 can be secured selectively at a first predetermined position by means of the first hook 31 and at a second predetermined position by means of the second hook 33. Therefore, in the present embodiment, the cord clamp 1 is made as a single body through the injection molding in the aforementioned manner that it can be used in either of the two positions, each being located at a right angle with the other.

Figure 6:
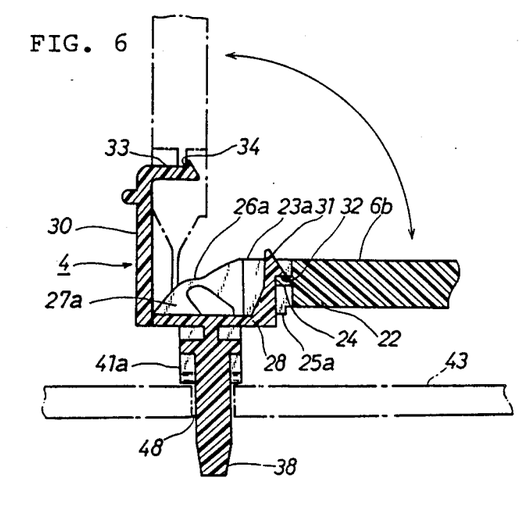
FIG. 6 is a sectional view of the main portion showing the engagement of the arm and the arm support member.

FIG. 6 is a cross section of the main portion of the cord clamp 1 which is secured in the first position and in the second position. The arm support member 4 is attached to the base plate 43, maintaining a determined space therebetween by the fastening member 38 and the resilient wings 41a and 41b. The arm 2 functions as a lever and swings on the hinges 26a and 26b. Now, if the arm 2 is swung in a direction to which the hinges 26a and 26b can be bent, the first hook 31 is resiliently deformed, and then the back face of the engaging tooth 24 is engaged with the step portion 32 of the first hook 31. When the arm 2 is locked in the aforementioned state shown by a hatched portion in FIG. 6, the step portion 32 is pressed into contact with the back face of the engaging tooth 24 while the spacers 25a and 25b are pressed into contact with the arm support base 28. As a result, the arm 2 is secured at the first predetermined position extending parallel to the base plate 43 at a determined distance therebetween.

If the arm 2 is swung in a direction to which the hinges 26a and 26b are to return due to the resiliency, the first hook 31 is resiliently deformed leftward in FIG. 6 by the force from the arm 2. As a result, the back face of the engaging tooth 24 is disconnected from the step portion 32. Thereafter, if the arm 2 is further swung in the same direction, the engaging tooth 24 of the arm 2 pushes down the slanting tip of the second hook 33. Consequently, the front face of the engaging tooth 24 is engaged with the step portion 34 of the second hook 33. When the arm 2 is locked in the aforementioned state shown by the interrupted lines in FIG. 6, the step portion 34 is pressed into contact with the front face of the engaging tooth 24 while the back faces of the joint side portions 23a and 23b are pressed into contact with the arm support back wall 30. As a result, the arm 2 is secured at the second predetermined position extending vertically to the base plate 43. Moreover, if the arm 2 at the second position is swung in a direction to which the hinges 26a and 26b can be bent, the second hook 33 is resiliently deformed downward owing to the force from the arm 2. As a result, the front face of the engaging tooth 24 is disconnected from the step portion 34.

Figure 7:
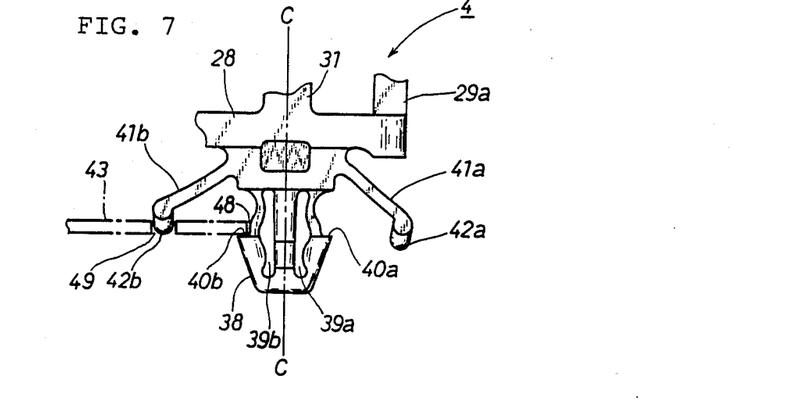
FIG. 7 is a partial front view of the cord clamp illustrating the cord clamp before and after the arm support member is attached to a base plate.

FIG. 7 is a front view of the main portion of the cord clamp 1 wherein: the right side to the center line C—C illustrates the cord clamp 1 before the attachment to the base plate 43; and the left side to the center line C—C illustrates the cord clamp 1 after the attachment to the base plate 43. In the attached state shown in the left side of FIG. 7, the base plate 43 is pressed and held between the step portion 40b of the fixing member 38 and the resilient wing 41b due to the resilient deformation. Moreover, the protrusion 42b for preventing the rotation of the fixing member 5 is fit in an aperture 49 on the base plate 43. Therefore, the cord clamp 1 does not rotate at the fixed position.

Figure 8:
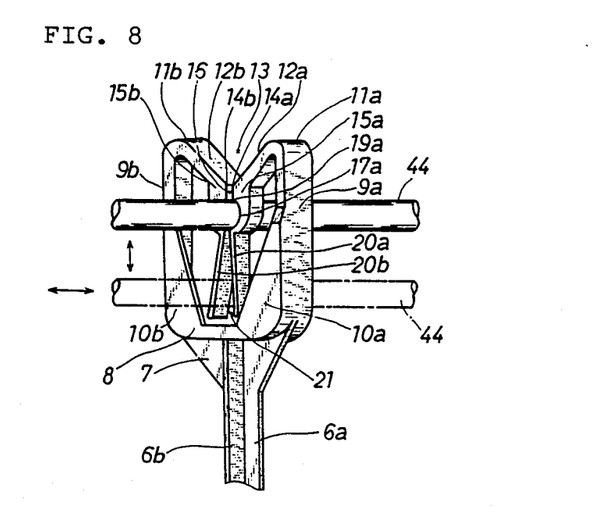
FIG. 8 is a partial perspective view of the cord clamp receiving a cord.

FIG. 8 is a perspective view of main portions of the cord clamp 1 wherein a cord 44 is received in the cord support member 3. When the cord 4 is pushed down from the insert groove 13 into the insert gap 16 via the insert guides 12a and 12b, the insert guides 12a and 12b are resiliently deflected outward on basis of the curved portions 11a and 11b. As a result, the gap between the cord fastening portions 15a and 15b is widened to allow the cord 44 to be inserted in the insert gap 16. If the cord 44 in the insert gap 16 is pushed down further, it is received in the cord insert hole 18 and held between the recesses 17a and 17b. The resiliency of the insert guides 12a and 12b grips the cord 44 so firmly that it cannot move in its axial direction. When an attempt is made to remove the cord 44 out of the cord insert hole 18 toward the insert groove 13, the cord 44 pushes the cord stoppers 19a and 19b upward. As a result, the insert guides 12a and 12b are deflected on basis of the curved portions 11a and 11b, thus narrowing the insert gap 16 and preventing the cord 44 from being easily removed. On the other hand, when the cord 44 in the cord insert hole 18 is pushed down toward the slit 21, the cord fastening portions 15a and 15b are deflected on basis of the corners 14a and 14b, thus widening the cord insert hole 18. Accordingly, the insert guides 12a and 12b above the cord fastening portions 15a and 15b are deflected on basis of the curved portions 11a and 11b, thus additionally widening the cord insert hole 18. As a result, the cord 44 is inserted in the slit 21 between the strips 20a and 20b. The lower ends of the strips 20a and 20b do not connect with any portions while the upper ends thereof are joined with the cord fastening portions 15a and 15b. Therefore, the strips 20a and 20b do not support the cord 44 so firmly that the cord 44 in the slit 21 can move along its axial direction. If the cord 44 is pushed up from the slit 21 into the cord insert hole 18 again, the slit 21 between the strips 20a and 20b is easily widened so that the cord 44 can be gripped firmly in the cord insert hole 18.

Figure 9A:
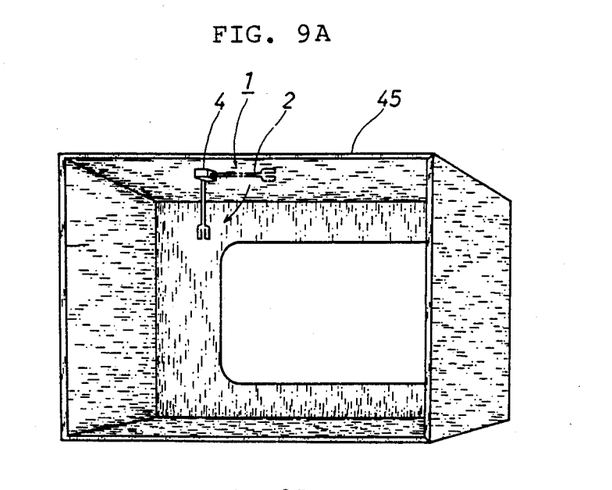
FIGS. 9A and 9B are perspective views, each showing an application of the cord clamp.

With reference to FIG. 9A, an explanation will be presented in case the cord clamp 1 is used in its second position of the present invention—illustrated by chain lines in FIG. 6—wherein the arm 2 projects from an inner surface of a cabinet 45 which completely opens at one of its sides for allowing a device to be installed therefrom. First of all, the arm support member 4 is attached to a certain position inside the cabinet 45, and then the arm 2 is locked at the first position; i.e., the arm 2 is located along the base plate of the cabinet 45 where the arm support member 4 has been attached, as illustrated by chain lines in FIG. 9A. Thus, the attached cord clamp 1 does not hinder the installation of the device to the cabinet 45. After the installation of the device, the arm 2 is swung to the second position where a cord will be supported by the cord support member 3. To elaborate, the arm 2 projects vertically to the base plate of the cabinet 45, as illustrated by solid lines in FIG. 9A.

Figure 9B:
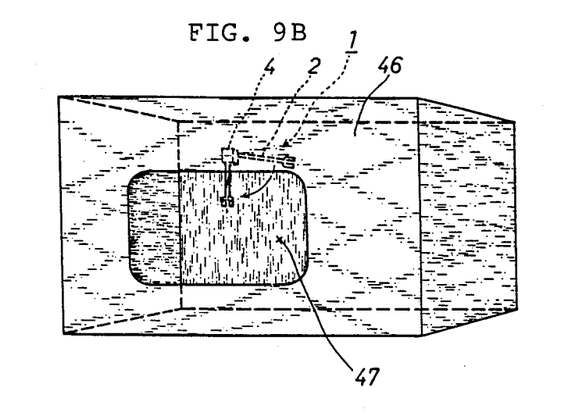

With reference to FIG. 9B, an explanation will be presented in the case that the cord clamp 1 is used in its first position—illustrated by the hatched area in FIG. 6—wherein the arm 2 exposes from an opening 47 provided on one of the sides of a cabinet 46 for allowing a device to be installed therefrom. First, the arm support member 4 is attached to a certain position inside the cabinet 46, and then the arm 2 is locked at the second position; i.e., the arm 2 is located vertically to the base plate of the cabinet 46 where the arm support member 4 has been attached, as illustrated by chain lines in FIG. 9B. Thus, the attached cord clamp 1 does not hinder the installation of the device into the cabinet 46. After the installation of the device, the arm 2 is swung into the first position where a cord will be supported by the cord support member 3. To elaborate, the arm 2 extends along the base plate of the cabinet 46 and exposes from the opening 47 as illustrated in FIG. 9B by solid lines.

According to the present embodiment described above, the arm 2 of the cord clamp 1 can be secured at either of the first and second positions firmly enough to clamp a cord. Moreover, the swing function of the arm 2 makes it easy to lock the arm 2 selectively at these positions by one's finger tips. The fixing member 5, by which the arm support member 4 is fixed to a base plate 43 and the like, is provided with the resilient wings 41a and 41b having the protrusions 42a and 42b for preventing the rotation of the fixing member 5. As a result, the rotation of the arm support member 4 can be prevented and the distance between the arm support member 4 and the base plate 43 can be maintained, which facilitates fixing and shifting of the arm 2. Owing to the slit 21 in the cord support member 3, the clamped cord 44 can be slid in its axial direction in the cord support member 3 for allowing the adjustment of the cord tension. If the cord clamp 1 is attached to the base plate 43 with the cord 44 fit in this slidable position, the installation of the cord clamp 1 as well as a device will be easily completed by pulling up the arm 2 and positioning the cord 44 after fixing the device in the cabinet where the cord clamp 1 is already fixed. Moreover, the arm support back wall 30 of the support member 4 is constructed as a lid which connects with the arm support side wall 29a via the hinge 35. Therefore, the cord clamp 1 can be molded integrally through the injection molding, which simplifies the manufacturing process.

Having described a specific embodiment of the present invention, it is to be understood that modification and variation of the invention is possible in light of the above teaching. For instance, the arm of the cord clamp may be structured not as a straight bar but as a flexible bar as occasion demands. To elaborate, in case the cord clamp 1 is used with its curved arm located in the first position, the arm length can freely define the creeping distance for voltage leakage prevention required for the cord in the ignition system of an automobile. Furthermore, the location where the cord clamp is applied is not limited to an inner surface of the cabinet, and it may be applied on a base plate provided with any device thereon. If the cord clamp is to be attached adjacent to the device on the base plate, the cord clamp 1 may be fixed on the base plate in parallel thereto prior to the installation of the device. As a result, the cord clamp never hinders the installation of the device, thereby simplifying the attachment of the cord clamp as well as the device.

What is claimed is:

1. A cord clamp comprising:
   an arm;
   a cord support member connected to one end of the arm for holding a cord;
   an arm support member comprising a base portion and a wall portion attached to and extending at a non-zero angle with respect to said base portion;
   a hinge joining the arm to said base portion, adjacent to said wall portion, said hinge allowing the arm to swing from a first position substantially parallel to said base portion and away from said wall portion to a second position substantially parallel to said wall portion and away from said base portion;
   a first hook means provided on said base portion and a second hook means provided on said wall portion, the first and second hook means for releasably locking an engaging tooth of the arm when said arm is in said first and second positions, respectively; and
   a fixing member extending from the arm support member to fasten the cord clamp on a base plate.

2. A cord clamp according to claim 1, wherein said base portion and said wall portion extend orthogonally with respect to each other.

3. A cord clamp according to claim 1, wherein the arm support member further comprises a pair of side walls that connect to the base portion and said wall portion.

4. A cord clamp according to claim 3, wherein said wall portion is integrally hinged to one of said side walls and engages a third hook means provided on the other one of said side walls.

5. A cord clamp according to claim 1, wherein a leg portion connects the hinge to said base portion and said hinge comprises a resilient extension of said leg portion having a reduced cross-sectional area.

6. A cord clamp according to claim 2, wherein the first hook means projects perpendicularly from said base portion and the second hook means projects perpendicularly from said wall portion, such that the first hook means and second hook means extend orthogonally with respect to each other.

7. A cord clamp according to claim 1, wherein said first and second hook means are resilient and arranged to automatically lock with opposite edges of said tooth when said arm is moved to said first and second positions, respectively.

8. A cord clamp according to claim 1, wherein said cord clamp consists of a one-piece integrally molded structure.

9. A cord clamp according to claim 1, wherein the cord support member includes: a base; a pair of side walls extending upright from the base; a pair of curved portions connected to the side walls; and a pair of insert guides extending inward from the curved portions, and the cord support member is sized, shaped, and positioned to receive the cord.

10. A cord clamp according to claim 9, wherein each of the insert guides is provided with a recess.

11. A cord clamp according to claim 9, wherein the insert guides have a pair of strips which define a slit to allow the cord to slide therein.

12. A cord clamp comprising:
    an arm;
    a cord support member connected to one end of the arm for holding a cord;
    an arm support member that comprises a base, a pair of side walls that connect to the base, a back wall that connects to a first of said pair of side walls via a first hinge and engages a second of said pair of side walls via a lock member and a protrusion;
    a second hinge for joining the arm to the base via a leg portion provided on the base and for swinging the arm from a first position to a second position and vice versa;
    a first hook and a second hook provided on the arm support member for releasably locking an engaging tooth of the arm at said first position and said second position, respectively; and
    a fixing member extending from the arm support member for fastening the cord clamp on a base plate.

13. A cord clamp according to claim 12, wherein the lock member is provided on the back wall and the protrusion is provided on the second side wall.

14. A cord clamp according to claim 12, wherein said first position is adjacent an edge of the base and said second position is adjacent an edge of the back wall; and
    wherein the first and second hooks engage back and front edges of the tooth, respectively.

15. A cord clamp according to claim 12, wherein the first hook projects perpendicularly from an inner surface of the base and the second hook projects perpendicularly from an inner surface of the back wall, so that the first hook and the second hook extend orthogonally with respect to each other.

* * * * *